US012236132B2

(12) United States Patent
Jean et al.

(10) Patent No.: US 12,236,132 B2
(45) Date of Patent: Feb. 25, 2025

(54) STATUS CHECKING METHOD, MEMORY STORAGE DEVICE AND MEMORY CONTROL CIRCUIT UNIT

(71) Applicant: PHISON ELECTRONICS CORP., Miaoli (TW)

(72) Inventors: Sebastien Jean, Miaoli (TW); Ming-Jen Liang, Hsinchu (TW)

(73) Assignee: PHISON ELECTRONICS CORP, Miaoli (TW)

( * ) Notice: Subject to any disclaimer, the term of this patent is extended or adjusted under 35 U.S.C. 154(b) by 170 days.

(21) Appl. No.: 17/573,567

(22) Filed: Jan. 11, 2022

(65) Prior Publication Data

US 2023/0161503 A1     May 25, 2023

(30) Foreign Application Priority Data

Nov. 22, 2021   (TW) .................................. 110143345

(51) Int. Cl.
*G06F 3/06*   (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G06F 3/061
See application file for complete search history.

(56) References Cited

U.S. PATENT DOCUMENTS

| 10,310,923 | B1* | 6/2019 | DeRosa | ............... G06F 11/0727 |
| 2014/0215057 | A1* | 7/2014 | Walsh | ................. H04L 41/5009 |
| | | | | 709/224 |
| 2015/0006794 | A1* | 1/2015 | Kang | .................... G06F 3/0613 |
| | | | | 711/103 |
| 2015/0186072 | A1 | 7/2015 | Darragh et al. | |
| 2017/0177241 | A1* | 6/2017 | Erickson | ............... G06F 3/0655 |
| 2019/0235790 | A1* | 8/2019 | Koo | ......................... G06F 21/78 |
| 2023/0063656 | A1* | 3/2023 | Kim | ....................... G11C 16/14 |

FOREIGN PATENT DOCUMENTS

| CN | 110377538 | 10/2019 |
| WO | WO-2023009122 A1 * | 2/2023 |

OTHER PUBLICATIONS

"Office Action of Taiwan Counterpart Application", issued on Oct. 25, 2022, p. 1-p. 7.

* cited by examiner

*Primary Examiner* — Khoa D Doan
*Assistant Examiner* — Tong B. Vo
(74) *Attorney, Agent, or Firm* — JCIPRNET

(57) ABSTRACT

A memory management method, a memory storage device and a memory control circuit unit are disclosed. The method includes: sending a first operation command sequence to a rewritable non-volatile memory module to instruct a first memory module in the rewritable non-volatile memory module to perform a first operation; obtaining a first time threshold value corresponding to the first operation; updating a first counting value corresponding to the first memory module; and sending a first query command sequence to the rewritable non-volatile memory module to query a status of the first memory module, in response to that the first counting value reaches the first time threshold value.

24 Claims, 7 Drawing Sheets

| Operation type | Time threshold value |
|---|---|
| Operation(A) | T(A) |
| Operation(B) | T(B) |
| Operation(C) | T(C) |
| ⋮ | ⋮ |

FIG. 9

STATUS CHECKING METHOD, MEMORY STORAGE DEVICE AND MEMORY CONTROL CIRCUIT UNIT

CROSS-REFERENCE TO RELATED APPLICATION

This application claims the priority benefit of Taiwan application Ser. No. 110143345, filed on Nov. 22, 2021. The entirety of the above-mentioned patent application is hereby incorporated by reference herein and made a part of this specification.

BACKGROUND

Technical Field

The invention relates to a memory management technology, and particularly relates to a memory management method, a memory storage device and a memory control circuit unit.

Description of Related Art

Portable electronic devices like mobile phones and notebooks have grown rapidly in recent years, which has led to a rapid increase in consumer demand for storage media. Since the rewritable non-volatile memory module (for example, a flash memory) has characteristics such as non-volatile data, power saving, small size, and no mechanical structure, the rewritable non-volatile memory module is very suitable to be built in the various portable electronic devices.

Generally speaking, if the rewritable non-volatile memory module includes multiple memory modules, each memory module may be used individually to perform reading or writing of data. To obtain a current status of each memory module (for example, busy or ready), a memory controller generally queries the current statuses of the respective memory modules in sequence through polling at regular intervals. However, as the number of memory modules included in the rewritable non-volatile memory module increases, each round of pooling becomes more and more time-consuming. As a consequence, system operation becomes less efficient.

SUMMARY

In view of this, the invention provides a memory management method, a memory storage device, and a memory control circuit unit capable of facilitating the efficiency of querying statuses of memory modules.

An exemplary embodiment of the invention provides a memory management method for a rewritable non-volatile memory module including multiple memory modules. The memory management method includes: sending a first operation command sequence to the rewritable non-volatile memory module to instruct a first memory module in the multiple memory modules to perform a first operation; obtaining a first time threshold value corresponding to the first operation; updating a first counting value corresponding to the first memory module; and sending a first query command sequence to the rewritable non-volatile memory module to query a status of the first memory module, in response to that the first counting value of a first counter reaches the first time threshold value.

Another exemplary embodiment of the invention provides a memory storage device, including a connection interface unit, a rewritable non-volatile memory module, and a memory control circuit unit. The connection interface unit is configured to be coupled to a host system. The rewritable non-volatile memory module includes multiple memory modules. The memory control circuit unit is coupled to the connection interface unit and the rewritable non-volatile memory module. The memory control circuit unit is configured to: send a first operation command sequence to the rewritable non-volatile memory module to instruct a first memory module in the multiple memory modules to perform a first operation; obtain a first time threshold value corresponding to the first operation; update a first counting value corresponding to the first memory module; and sending a first query command sequence to the rewritable non-volatile memory module to query a status of the first memory module, in response to that the first counting value reaches the first time threshold value.

Yet another exemplary embodiment of the invention provides a memory control circuit unit for controlling a rewritable non-volatile memory module including multiple memory modules. The memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface. The memory management circuit is configured to: send a first operation command sequence to the rewritable non-volatile memory module to instruct a first memory module in the multiple memory modules to perform a first operation; obtain a first time threshold value corresponding to the first operation; update a first counting value corresponding to the first memory module; and sending a first query command sequence to the rewritable non-volatile memory module to query a status of the first memory module, in response to that the first counting value reaches the first time threshold value.

Based on the above, after sending the first operation command sequence to the rewritable non-volatile memory module to instruct the first memory module to perform the first operation, the first time threshold value corresponding to the first operation may be obtained and the first counting value corresponding to the first memory module may be updated. Thereafter, the first query command sequence may be sent to the rewritable non-volatile memory module to query the status of the first memory module, in response to that the first counting value reaches the first time threshold value. Compared with the conventional polling mechanism, the memory management method, the memory storage device, and the memory control circuit unit according to the exemplary embodiments of the invention are able to effectively facilitate the status query efficiency of the memory modules.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

FIG. 9 is a schematic view illustrating time threshold values corresponding to different types of operation according to the exemplary embodiment of the invention.

DESCRIPTION OF THE EMBODIMENTS

Figure 1:
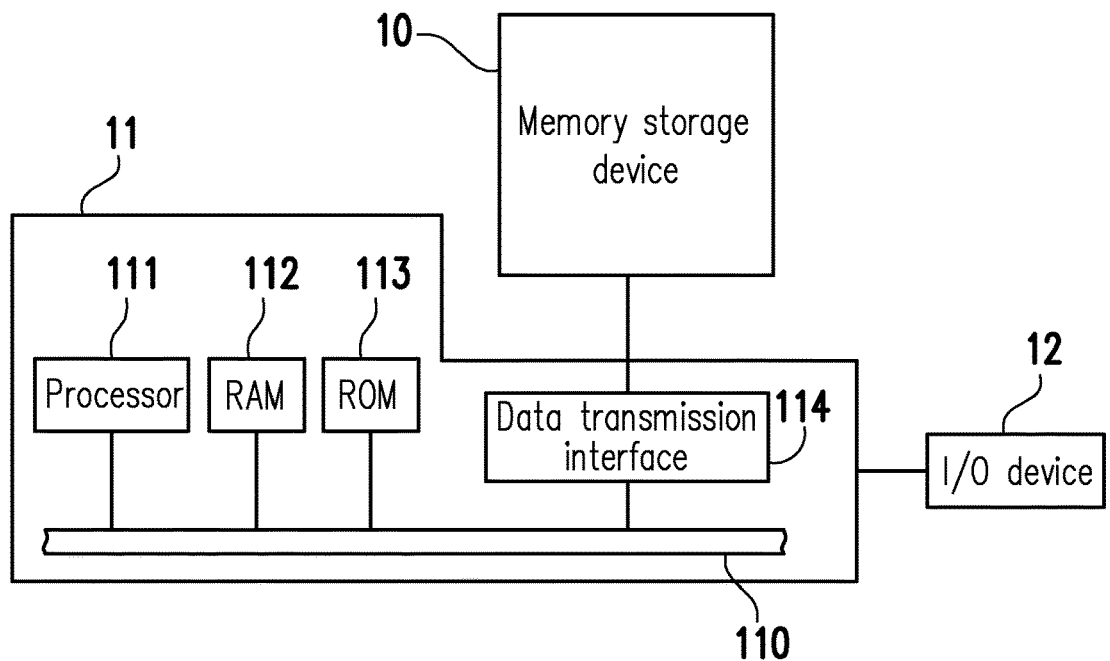
FIG. 1 is a schematic view illustrating a host system, a memory storage device, and an input/output (I/O) device according to an exemplary embodiment of the invention.

Reference will now be made in detail to the exemplary embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A,B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more," and "at least one" can be used interchangeably herein.

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 2:
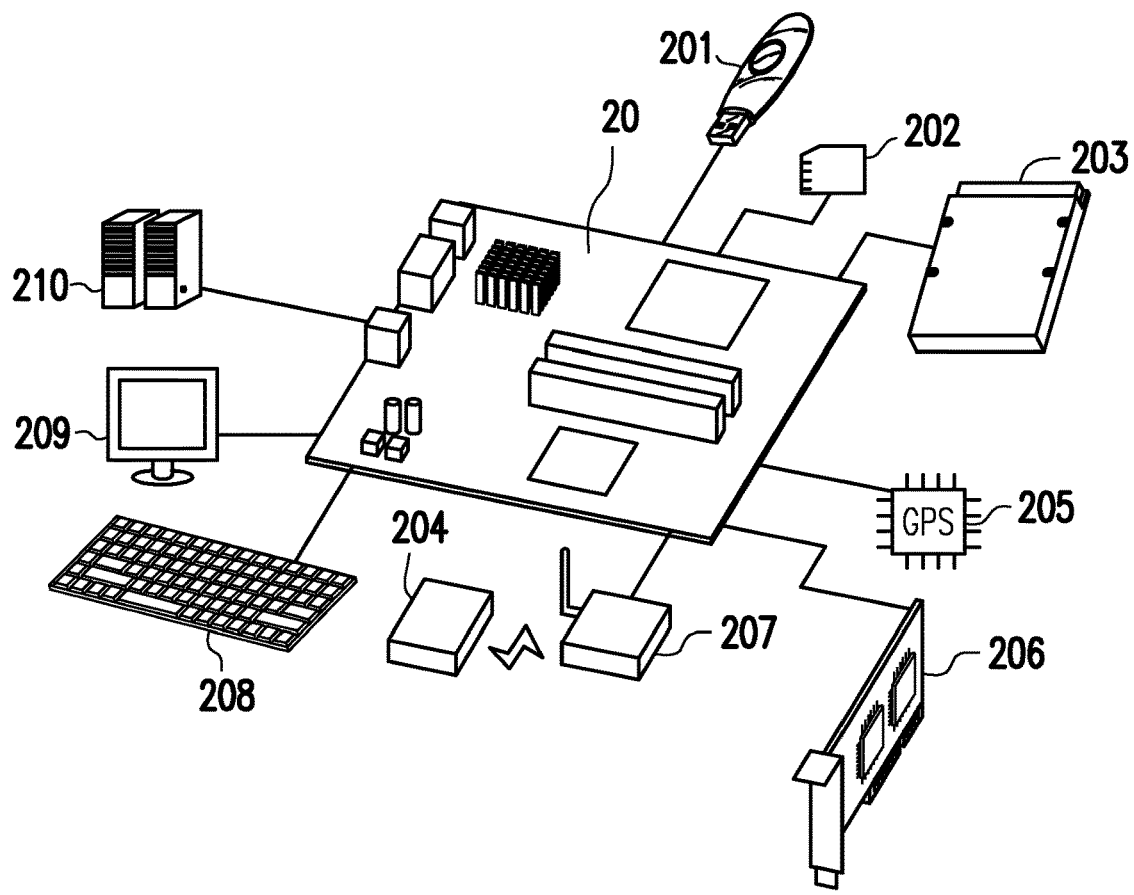
FIG. 2 is a schematic view illustrating the host system, the memory storage device, and the I/O device according to the exemplary embodiment of the invention.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Referring to FIG. 1 and FIG. 2, a host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For example, the host system 11 may store data to the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a Wi-Fi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
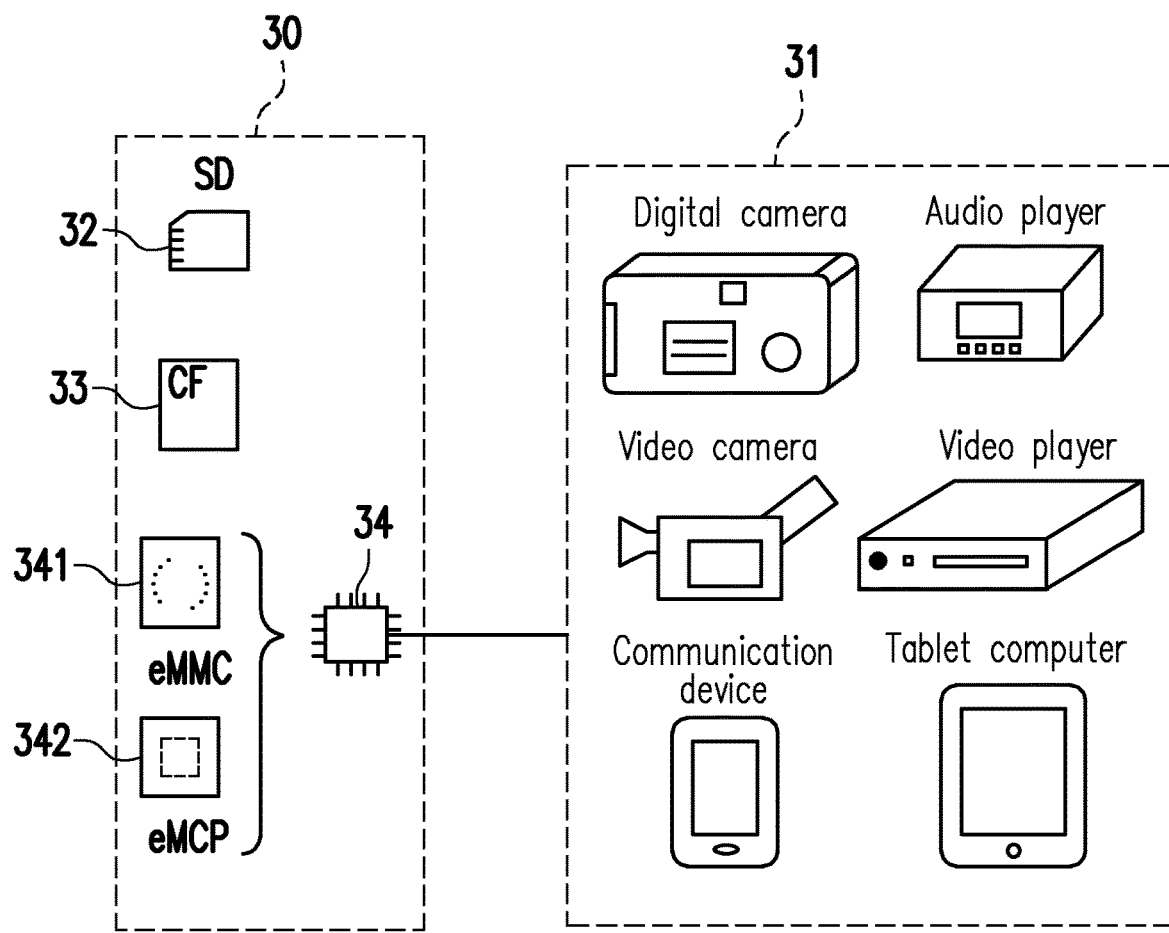
FIG. 3 is a schematic view illustrating the host system and the memory storage device according to the exemplary embodiment of the invention.

FIG. 3 is a schematic diagram of a host system and a memory storage device according to an exemplary embodiment of the disclosure. Referring to FIG. 3, the memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
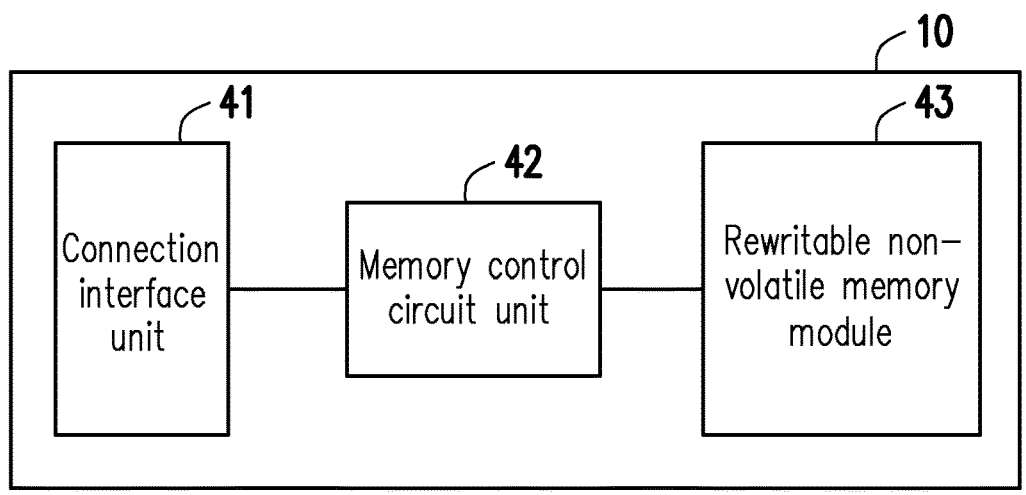
FIG. 4 is a schematic view illustrating the memory storage device according to the exemplary embodiment of the invention.

FIG. 4 is a schematic diagram of a memory storage device according to an exemplary embodiment of the disclosure. Referring to FIG. 4, the memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the multi chip package (MCP) interface standard, the multi media card (MMC) interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in a chip, or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is used to perform multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage statuses. Through applying a read voltage, it is possible to judge which storage status a memory cell belongs to, thereby obtaining one or more bits stored to the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area contains multiple physical sectors for storing user data, and the redundancy bit area is used to store system data (for example, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 5:
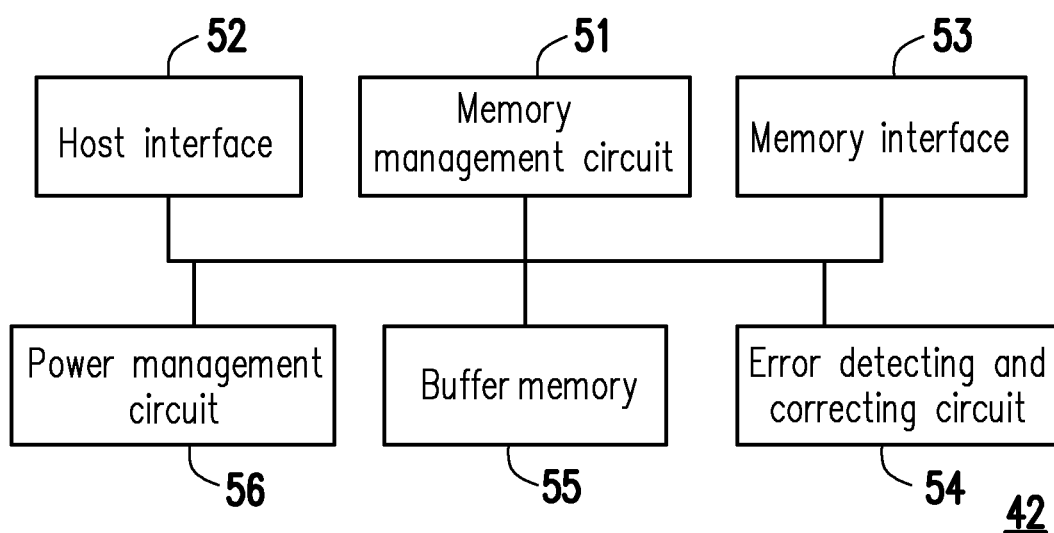
FIG. 5 is a schematic view illustrating the memory control circuit unit according to the exemplary embodiment of the invention.

FIG. 5 is a schematic diagram of a memory control circuit unit according to an exemplary embodiment of the disclosure. Referring to FIG. 5, the memory control circuit unit 42 includes a memory management circuit 51, a host interface 52, and a memory interface 53.

The memory management circuit 51 is used to control the entire operation of the memory control circuit unit 42. Specifically, the memory management circuit 51 has multiple control commands, and when the memory storage device 10 is operating, the control commands are performed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are performed by the microprocessor unit to perform operations such as data writing, reading, and erasing.

In another exemplary embodiment, the control commands of the memory management circuit 51 may also be stored to a specific area (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first performs the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data to the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written to the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct to perform corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, performing a garbage collection operation, etc.). The command sequences are, for example, generated by the memory management circuit 51 and sent to the rewritable non-volatile memory module 43 through the memory interface 53. The command sequences may include one or more signals, or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is used to perform error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data will also be read, and the error detecting and correcting circuit 54 will perform error detecting and correcting operations on the read data according to the error correcting code and/or the error detecting code.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
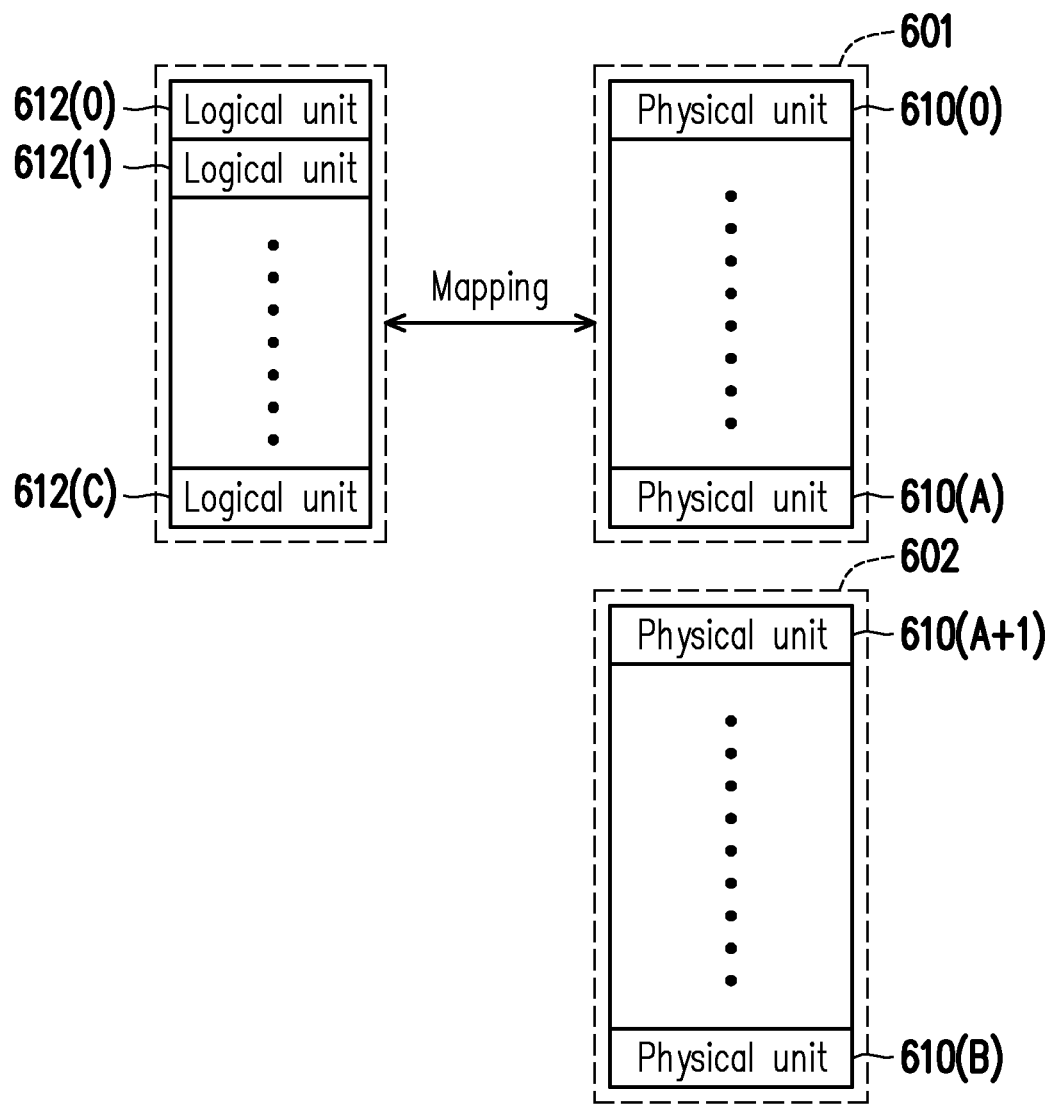
FIG. 6 is a schematic view illustrating a management of the rewritable non-volatile memory module according to the exemplary embodiment of the invention.

FIG. 6 is a schematic diagram of managing a rewritable non-volatile memory module according to an exemplary embodiment of the disclosure. Referring to FIG. 6, the memory management circuit 51 may logically group physical units 610(0) to 610(B) in the rewritable non-volatile memory module 43 into a storage area 601 and a spare area 602.

In an exemplary embodiment, a physical unit refers to a physical address or a physical programming unit. In an exemplary embodiment, a physical unit may also be composed of multiple continuous or discontinuous physical addresses. In an exemplary embodiment, a physical unit may also refer to a virtual block (VB). One virtual block may include multiple physical addresses or multiple physical programming units.

The physical units 610(0) to 610(A) in the storage area 601 are used to store user data (for example, the user data from the host system 11 of FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, the physical unit may be associated (or added) to the spare area 602. In addition, the physical units (or the physical units that do not store valid data) in the spare area 602 may be erased. When writing new data, one or more physical units may be extracted from the spare area 602 to store the new data. In an exemplary embodiment, the spare area 602 is also referred to as a free pool.

The memory management circuit 51 may be configured with logical units 612(0) to 612(C) to map the physical units 610(0) to 610(A) in the storage area 601. In an exemplary embodiment, each logical unit corresponds to one logical address. For example, one logical address may include one or more logical block addresses (LBA) or other logical management units. In an exemplary embodiment, one logical unit may also correspond to one logical programming unit or consist of multiple continuous or discontinuous logical addresses.

It should be noted that one logical unit may be mapped to one or more physical units. If a certain physical unit is currently mapped by a certain logical unit, it means that data currently stored in the physical unit includes valid data. Conversely, if a certain physical unit is not currently mapped by any logical unit, it means that data currently stored in the physical unit is invalid data.

The memory management circuit 51 may record management data (also referred to as logical-to-physical mapping information) describing a mapping relationship between the logical unit and the physical unit in at least one logical-to-physical mapping table. When the host system 11 intends to read data from the memory storage device 10 or write data to the memory storage device 10, the memory management circuit 51 may access the rewritable non-volatile memory module 43 according to information in the logical-to-physical mapping table.

Figure 7:
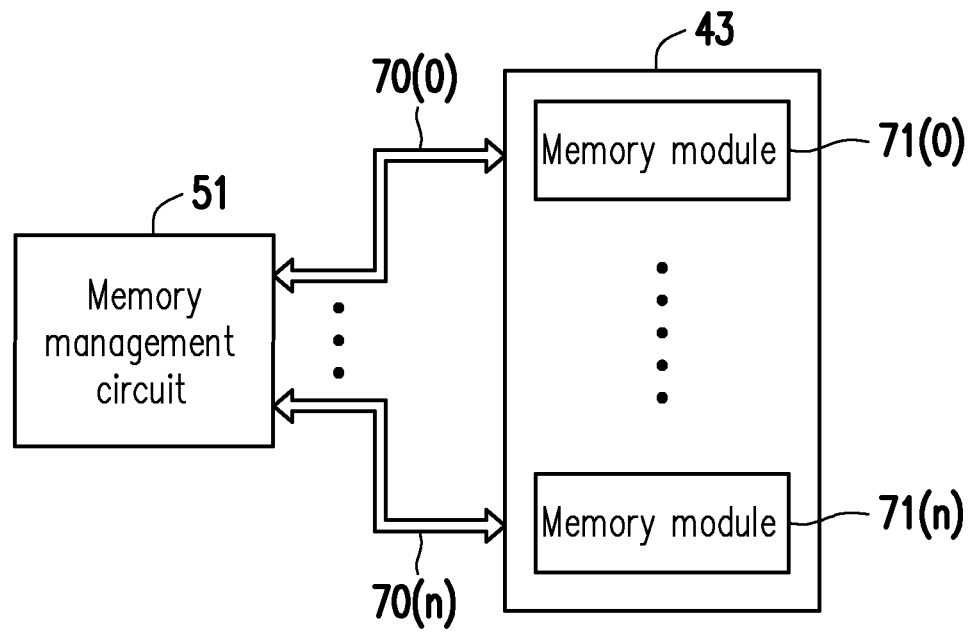
FIG. 7 is a schematic view illustrating communication between the memory management circuit and the rewritable non-volatile memory module via multiple channels illustrated according to the exemplary embodiment of the invention.

FIG. 7 is a schematic view illustrating communication between the memory management circuit and the rewritable non-volatile memory module via multiple channels illustrated according to the exemplary embodiment of the invention. Referring to FIG. 7, the rewritable non-volatile memory module 43 may include multiple memory modules 71(0) to 71(n), and n may be an arbitrary positive integer. Each memory module in the memory modules 71(0) to 71(n) may include multiple physical units. Each memory module in the memory modules 71(0) to 71(n) is able to individually perform operations such as data reading, writing or erasing. Furthermore, multiple memory modules in the memory modules 71(0) to 71(n) may also perform operations such as data reading, writing or erasing in parallel. For instance, one memory module in the memory modules 71(0) to 71(n) may refer to a plane, a chip enable (CE) area, a die or other physical management units.

The memory management circuit 51 may respectively communicate with the memory modules 71(0) to 71(n) via channels 70(0) to 70(n). For instance, the memory management circuit 51 may issue an operation command to a memory module 71(i) via a channel 70(i). The memory module 71(i) may receive the operation command via the channel 70(i) and perform a corresponding operation behavior. Moreover, the memory module 71(i) may send data back to the memory management circuit 51 via the channel 70(i). Alternatively, in an exemplary embodiment, multiple memory modules in the memory modules 71(0) to 71(n) may share the same channel 70(i).

The memory management circuit 51 may send an operation command sequence (also referred to as a first operation command sequence) to the rewritable non-volatile memory module 43 to instruct a certain memory module (also referred to as a first memory module) in the memory modules 71(0) to 71(n) to perform a specific operation (also referred to as a first operation). For instance, assuming that the first memory module is the memory module 71(i), then the memory module 71(i) may perform the first operation according to the first operation command sequence. For instance, the first operation may include reading data from at least one physical unit in the memory module 71(i), writing data into at least one physical unit in the memory module 71(i), or erasing at least one physical unit in the memory module 71(i).

Besides, the memory management circuit 51 may obtain a time threshold value (also referred to as a first time threshold value) corresponding to the first operation. The first time threshold value may be close to the time required for the first memory module to perform the first operation. For instance, assuming that the time required for the first memory module to completely perform the first operation is about 30 microseconds (μs), the first time threshold value may be close to and/or slightly less than 30 microseconds.

After sending the first operation command sequence, the memory management circuit 51 may keep updating a counting value (also referred to as a first counting value) corresponding to the first memory module. The first counting value may be positively correlated with a time duration that has passed after the memory management circuit 51 issues the first operation command sequence. For example, if the first counting value is 20, it means that approximately 20 microseconds have passed since the memory management circuit 51 issues the first operation command sequence.

In an exemplary embodiment, the memory management circuit 51 may determine whether the first counting value reaches (for example, greater than or equal to) the first time threshold value. If the first counting value reaches the first time threshold value, it indicates that there is a high chance that the first operation performed by the first memory module has been completed or is nearly completed. If the first operation performed by the first memory module has been completed, the first memory module may be switched to a ready status. Under the ready status, the first memory module may start to perform the next operation. In addition, if the first counting value does not reach the first time threshold value, there is a high chance that the first operation performed by the first memory module has not been completed. If the first operation performed by the first memory module has not been completed, the first memory module may stay in a busy status. Under the busy status, the first memory module is unable to perform other operations.

The memory management circuit 51 may send a query command sequence (also referred to as a first query command sequence) to the rewritable non-volatile memory module 43 to query a status of the first memory module, in response to that the first counting value reaches the first time threshold value. For example, if the first memory module is the memory module 71(i), the first query command sequence may be transmitted via the channel 70(i). In response to the first query command sequence, the rewritable non-volatile memory module 43 may send a status information (also referred to as a first status information) back to the memory management circuit 51. The memory management circuit 51 may obtain the status of the first memory module according to the status information. For example, if the first memory module is the memory module 71(i), the first status information may be transmitted via the channel 70(i). Alternatively, in an exemplary embodiment, if the first counting value does not reach the first time threshold value, the memory management circuit 51 may not send the first query command sequence.

Figure 8:
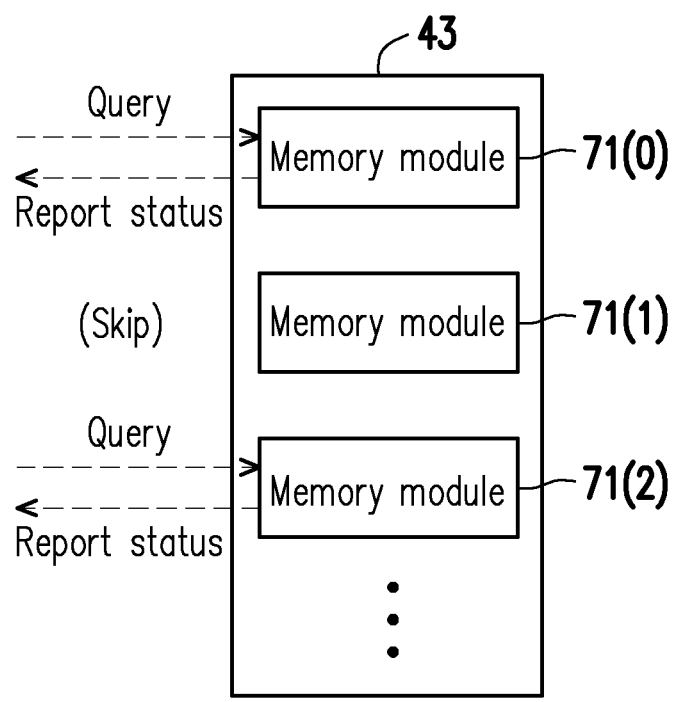
FIG. 8 is a schematic view illustrating querying a status of the memory module according to the exemplary embodiment of the invention.

FIG. 8 is a schematic view of querying a status of the memory module illustrated according to the exemplary embodiment of the invention. Referring to FIG. 7 and FIG. 8, in an exemplary embodiment, the memory management circuit 51 may send the query command sequence to the rewritable non-volatile memory module 43 at a certain time point (also referred to as a first time point) to query a status of the memory modules 71(0) and 71(2), whereas the memory module 71(1) is skipped. In response to the query command sequence, the memory modules 71(0) and 71(2) may report their respective statuses to the memory management circuit 51, but the memory module 71(1) does not need to report the status of the memory module 71(1) to the memory management circuit 51. By this way, the status of the memory modules (such as the memory modules 71(0) and 71(2)) whose tasks are about to be completed or have been completed are able to be queried. On the other hand, the status of a memory module whose tasks clearly are yet to be completed (such as the memory module 71(1)) may not to be queried temporarily, so as to avoid occupying a communication bandwidth between the memory management circuit 51 and the rewritable non-volatile memory module 43. Furthermore, in the exemplary embodiment of FIG. 8, at the first time point, the statuses of a greater or fewer number of the memory modules may be queried, and/or a greater or fewer number of memory modules may be skipped, and the invention is not particularly limited in this regard.

In an exemplary embodiment, the memory management circuit 51 may obtain the first time threshold value corresponding to the first operation according to a type of the first operation. For example, according to different types of first operations, the obtained first time threshold values may be different.

In an exemplary embodiment, a type in response to the first operation is a first type of operation, and the memory management circuit 51 may determine the first time threshold value as a certain time value (also referred to as a first time value). Or, a type in response to the first operation is a second type of operation, and the memory management circuit 51 may determine the first time threshold value as another time value (also referred to as a second time value). The first time value may be different from the second time value. For example, assuming that the first operation is a reading operation, the first time threshold value may be determined as 27 or 30 microseconds. Alternatively, assuming that the first operation is a writing operation, the first time threshold value may be determined as 115 or 120 microseconds.

FIG. 9 is a schematic view illustrating time threshold values corresponding to different types of operation according to the exemplary embodiment of the invention. Referring to FIG. 9, in an exemplary embodiment, the memory management circuit 51 may query a table information 91 to obtain a time threshold value corresponding to a specific type of operation. The table information 91 may be stored in the rewritable non-volatile memory module 43. For instance, the table information 91 may contain time threshold values T(A), T(B), and T(C) respectively corresponding to an operation (A), an operation (B), and an operation (C) of different types. For instance, the operation (A), the operation (B), and the operation (C) may respectively be a reading operation, a writing operation, and an erasing operation. According to the type of the first operation, the memory management circuit 51 may obtain the first time threshold value corresponding to the first operation from the table information 91. For instance, assuming that the first operation belongs to the operation (A), the memory management circuit 51 may set the first time threshold value according to the time threshold value T(A).

In an exemplary embodiment, the memory management circuit 51 may record an actual completion time of the first operation. Then, the memory management circuit 51 may adjust the first time threshold value according to the actual completion time of the first operation. For example, assuming that the first operation belongs to the operation (A) in the table information 91, after the first memory module performs the first operation, the memory management circuit 51 may record the actual completion time of the first operation and update or adjust the time threshold value T(A) in the table information 91 according to the actual completion time. By this way, the table information 91 may be continuously maintained according to a latest status of each memory module.

In an exemplary embodiment, after sending the first operation command sequence, the memory management circuit 51 may receive a time evaluation information corresponding to the first memory module from the rewritable non-volatile memory module 43. The time evaluation information may reflect a time duration required for the first memory module to perform the first operation. For instance, assuming that the first memory module is the memory module 70(i), and the time required for the memory module 70(i) to completely perform the first operation is about 30 microseconds, the rewritable non-volatile memory module 43 may send the time evaluation information corresponding to the first memory module to the memory management circuit 51 via the channel 70(i). The memory management circuit 51 may obtain that the required time duration for the memory module 70(i) to completely perform the first operation is about 30 microseconds according to the time evaluation information. Then, the memory management circuit 51 may determine the first time threshold value according to the time evaluation information, such as setting the first time threshold value as 27 microseconds (for example, 30×0.9=27).

Back to FIG. 7, in an exemplary embodiment, the memory management circuit 51 may send another operation command sequence (also referred to as a second operation command sequence) to the rewritable non-volatile memory module 43 to instruct another memory module (also referred to as a second memory module) in the rewritable non-volatile memory module 43 to perform a specific operation (also referred to as a second operation). The memory management circuit 51 may obtain the time threshold value corresponding to the second operation (also referred to as a second time threshold value). Particularly, the second time threshold value may be different from the first time threshold value. For example, the first time threshold value may be 27 microseconds (corresponding to the first operation as the reading operation), and the second time threshold value may be 115 microseconds (corresponding to the second operation as the writing operation).

After sending the second operation command sequence, the memory management circuit 51 may keep updating a counting value corresponding to the second memory module (also referred to as a second counting value). The memory management circuit 51 may send a query command sequence (also referred to as a second query command sequence) to the rewritable non-volatile memory module 43 to query a status of the second memory module, in response to that the second counting value reaches the second time threshold value. Moreover, if the second counting value does not reach the second time threshold value, the memory management circuit 51 may not send the second query command sequence. For the related operation details, reference is made to the description of the aforementioned exemplary embodiments, and the same details will not be repeated in the following.

In an exemplary embodiment, the memory management circuit 51 may send another operation command sequence (also referred to as a third operation command sequence) to the rewritable non-volatile memory module 43 to instruct the first memory module to perform a specific operation (also referred to as a third operation). The memory management circuit 51 may obtain the time threshold value corresponding to the third operation (also referred to as a third time threshold value). Particularly, the third time threshold value may be different from the first time threshold value. For example, the first time threshold value may be 27 microseconds (corresponding to the first operation as the reading operation), and the third time threshold value may be 115 microseconds (corresponding to the third operation as the writing operation).

After sending the third operation command sequence, the memory management circuit 51 may keep updating the first counting value corresponding to the first memory module. The memory management circuit 51 may send a query command sequence (also referred to as a third query command sequence) to the rewritable non-volatile memory module 43 to query a status of the first memory module, in response to that the first counting value reaches the third time threshold value. Moreover, if the first counting value does not reach the third time threshold value, the memory management circuit 51 may not send the third query command sequence. For the related operation details, reference is made to the description of the aforementioned exemplary embodiments, and the same details will not be repeated in the following.

In an exemplary embodiment, if a status of a certain memory module (such as the first memory module) obtained by the query is the busy status, the memory module may be added to a polling list. Thereafter, the memory management circuit 51 may send the query command sequence again to query the status of the memory module according to the polling list at intervals, until the status of the memory module is switched to the ready status. In addition, the memory management circuit 51 may issue a new operation command sequence to the memory module in the ready status to instruct the memory module in the ready status to perform a next operation.

Figure 10:
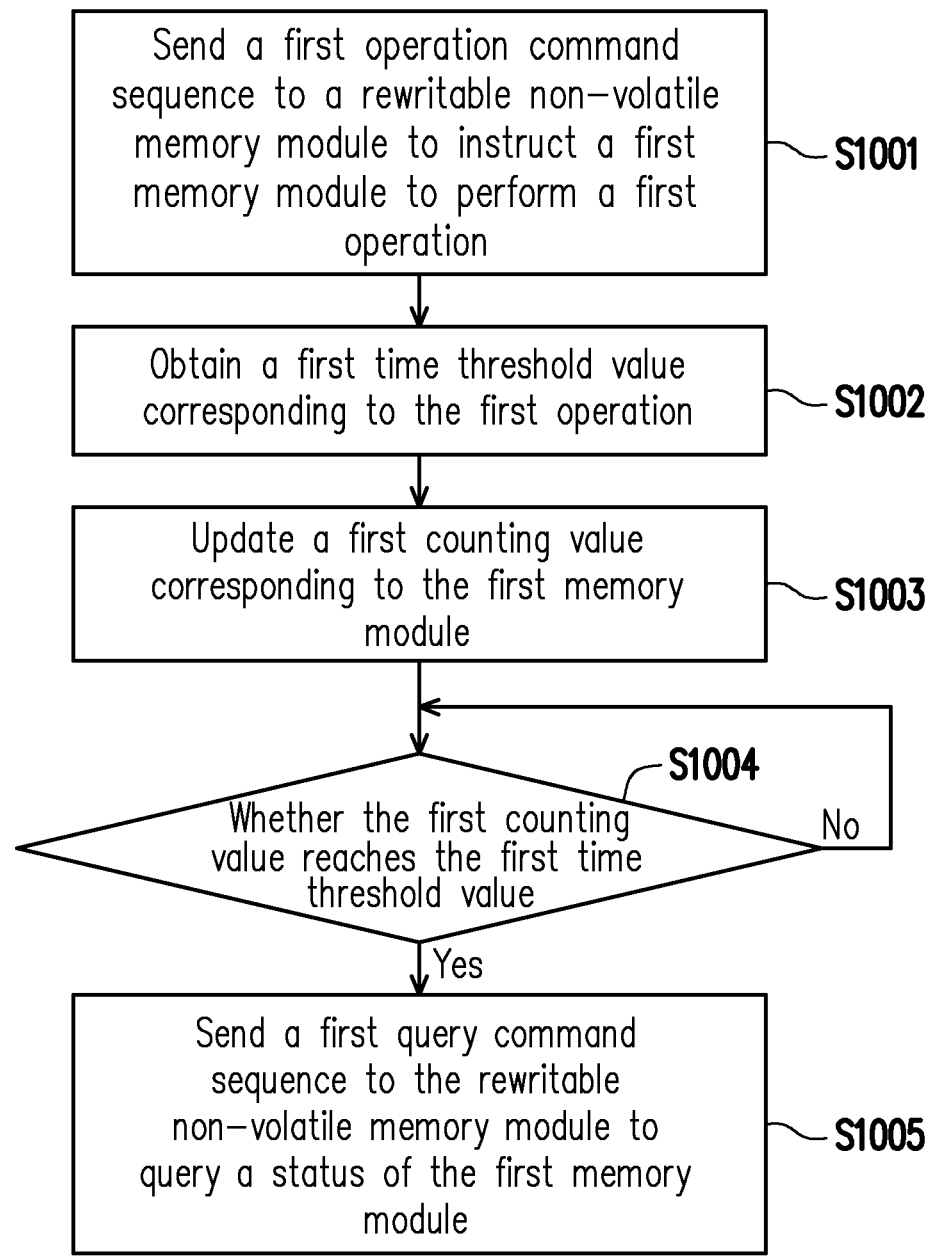
FIG. 10 is a flow chart illustrating a memory management method according to the exemplary embodiment of the invention.

FIG. 10 is a flow chart of a memory management method illustrated according to an exemplary embodiment of the invention. Referring to FIG. 10, in Step S1001, a first operation command sequence is sent to a rewritable non-volatile memory module to instruct a first memory module to perform a first operation. In Step S1002, a first time threshold value corresponding to the first operation is obtained. In Step S1003, a first counting value corresponding to the first memory module is updated. In Step S1004, whether the first counting value reaches the first time threshold value is determined. In Step S1005, a first query command sequence is sent to the rewritable non-volatile memory module to query a status of the first memory module, in response to that the first counting value reaches the first time threshold value. Alternatively, if the first counting value does not reach the first time threshold value, Step S1004 may be repeated.

Details of each step in FIG. 10 has been described as above, so the same details will not be repeated. It should be noted that each step in FIG. 10 may be implemented as multiple program codes or circuits. The invention is not particularly limited in this regard. In addition, the method of FIG. 10 may be utilized with the above exemplary embodiments, or may be utilized in individual. The invention is not particularly limited in this regard, either.

To sum up, the exemplary embodiments proposed by the invention are able to set the time threshold value for an operation task performed by a specific memory module. Thereafter, the status of the memory module is queried when the counting value corresponding to the memory module meets the time threshold value. By this way, even if a total number of the memory module continues to increase, the status query efficiency of the memory modules can still be facilitated. The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory management method for a rewritable non-volatile memory module comprising a plurality of memory modules, the memory management method comprising:
   sending a first operation command sequence to the rewritable non-volatile memory module to instruct a first memory module in the plurality of memory modules to perform a first operation;
   obtaining, according to the first operation being a write operation or a read operation, a first time threshold value corresponding to the first operation, wherein the first time threshold is determined to be different values each for controlling whether to query a status of the first memory module in response to different types of commands indicating the first operation;
   updating a first counting value corresponding to the first memory module;
   sending a first query command sequence to the rewritable non-volatile memory module to query the status of the first memory module, in response to that the first counting value reaches the first time threshold value;
   if the status of the first memory module obtained in response to the first query command sequence is a busy status, adding the first memory module to a polling list; and
   sending a second query command sequence to the first memory module according to the polling list at intervals until the status of the first memory module is switched to a ready status.

2. The memory management method of claim 1, further comprising:

not sending the first query command sequence, if the first counting value does not reach the first time threshold value.

3. The memory management method of claim 1, wherein obtaining, according to the first operation being the write operation or the read operation, the first time threshold value corresponding to the first operation comprises:
obtaining the first time threshold value corresponding to the first operation according to a type of the first operation.

4. The memory management method of claim 3, wherein obtaining the first time threshold value corresponding to the first operation according to the type of the first operation comprises:
determining the first time threshold value as a first time value in response to the type of the first operation being a first type of operation which comprises the read operation; and
determining the first time threshold value as a second time value in response to the type of the first operation being a second type of operation which comprises the write operation,
wherein the first time value is different from the second time value.

5. The memory management method of claim 1, further comprising:
adjusting the first time threshold value according to an actual completion time of the first operation.

6. The memory management method of claim 1, wherein obtaining, according to the first operation being the write operation or the read operation, the first time threshold value corresponding to the first operation comprises:
receiving a time evaluation information corresponding to the first memory module from the rewritable non-volatile memory module; and
determining the first time threshold value according to the time evaluation information.

7. The memory management method of claim 1, further comprising:
sending a second operation command sequence to the rewritable non-volatile memory module to instruct a second memory module in the plurality of memory modules to perform a second operation;
obtaining a second time threshold value corresponding to the second operation, wherein the second time threshold value is different from the first time threshold value;
updating a second counting value corresponding to the second memory module; and
sending a second query command sequence to the rewritable non-volatile memory module to query a status of the second memory module, in response to that the second counting value reaches the second time threshold value.

8. The memory management method of claim 1, further comprising:
sending a third operation command sequence to the rewritable non-volatile memory module to instruct the first memory module to perform a third operation;
obtaining a third time threshold value corresponding to the third operation, wherein the third time threshold value is different from the first time threshold value;
updating a third counting value corresponding to the first memory module; and
sending a third query command sequence to the rewritable non-volatile memory module to query the status of the first memory module, in response to that the third counting value reaches the third time threshold value.

9. A memory storage device, comprising:
a connection interface circuit, configured to be coupled to a host system;
a rewritable non-volatile memory module, comprising a plurality of memory modules; and
a memory control circuit unit, coupled to the connection interface unit and the rewritable non-volatile memory module,
wherein the memory control circuit unit is configured to:
send a first operation command sequence to the rewritable non-volatile memory module to instruct a first memory module in the plurality of memory modules to perform a first operation;
obtain, according to the first operation being a write operation or a read operation, a first time threshold value corresponding to the first operation, wherein the first time threshold is determined to be different values each for controlling whether to query a status of the first memory module in response to different types of commands indicating the first operation;
update a first counting value corresponding to the first memory module;
send a first query command sequence to the rewritable non-volatile memory module to query the status of the first memory module, in response to that the first counting value reaches the first time threshold value;
if the status of the first memory module obtained in response to the first query command sequence is a busy status, add the first memory module to a polling list; and
send a second query command sequence to the first memory module according to the polling list at intervals until the status of the first memory module is switched to a ready status.

10. The memory storage device of claim 9, wherein if the first counting value does not reach the first time threshold value, the memory control circuit unit does not send the first query command sequence.

11. The memory storage device of claim 9, wherein an operation of obtaining, according to the first operation being the write operation or the read operation, the first time threshold value corresponding to the first operation comprises:
obtaining the first time threshold value corresponding to the first operation according to a type of the first operation.

12. The memory storage device of claim 11, wherein an operation of obtaining the first time threshold value corresponding to the first operation according to the type of the first operation comprises:
determining the first time threshold value as a first time value in response to the type of the first operation being a first type of operation which comprises the read operation; and
determining the first time threshold value as a second time value in response to the type of the first operation being a second type of operation which comprises the write operation,
wherein the first time value is different from the second time value.

13. The memory storage device of claim 9, wherein the memory control circuit unit is further configured to:
adjust the first time threshold value according to an actual completion time of the first operation.

14. The memory storage device of claim 9, wherein an operation of obtaining, according to the first operation being the write operation or the read operation, the first time threshold value corresponding to the first operation comprises:
    receiving a time evaluation information corresponding to the first memory module from the rewritable non-volatile memory module; and
    determining the first time threshold value according to the time evaluation information.

15. The memory storage device of claim 9, wherein the memory control circuit unit is further configured to:
    send a second operation command sequence to the rewritable non-volatile memory module to instruct a second memory module in the plurality of memory modules to perform a second operation;
    obtain a second time threshold value corresponding to the second operation, wherein the second time threshold value is different from the first time threshold value;
    update a second counting value corresponding to the second memory module; and
    send a second query command sequence to the rewritable non-volatile memory module to query a status of the second memory module, in response to that the second counting value reaches the second time threshold value.

16. The memory storage device of claim 9, wherein the memory control circuit unit is further configured to:
    send a third operation command sequence to the rewritable non-volatile memory module to instruct the first memory module to perform a third operation;
    obtain a third time threshold value corresponding to the third operation, wherein the third time threshold value is different from the first time threshold value;
    update a third counting value corresponding to the first memory module; and
    send a third query command sequence to the rewritable non-volatile memory module to query the status of the first memory module, in response to that the third counting value reaches the third time threshold value.

17. A memory control circuit unit for controlling a rewritable non-volatile memory module comprising a plurality of memory modules, the memory control circuit unit comprising:
    a host interface configured to be coupled to a host system;
    a memory interface configured to be coupled to the rewritable non-volatile memory module; and
    a memory management circuit, coupled to the host interface and the memory interface,
    wherein the memory management circuit is configured to:
        send a first operation command sequence to the rewritable non-volatile memory module to instruct a first memory module in the plurality of memory modules to perform a first operation;
        obtain, according to the first operation being a write operation or a read operation, a first time threshold value corresponding to the first operation, wherein the first time threshold is determined to be different values each for controlling whether to query a status of the first memory module in response to different types of commands indicating the first operation;
        update a first counting value corresponding to the first memory module;
        send a first query command sequence to the rewritable non-volatile memory module to query the status of the first memory module, in response to that the first counting value reaches the first time threshold value;
        if the status of the first memory module obtained in response to the first query command sequence is a busy status, add the first memory module to a polling list; and
        send a second query command sequence to the first memory module according to the polling list at intervals until the status of the first memory module is switched to a ready status.

18. The memory control circuit unit of claim 17, wherein if the first counting value does not reach the first time threshold value, the memory management circuit does not send the first query command sequence.

19. The memory control circuit unit of claim 17, wherein an operation of obtaining, according to the first operation being the write operation or the read operation, the first time threshold value corresponding to the first operation comprises:
    obtain the first time threshold value corresponding to the first operation according to a type of the first operation.

20. The memory control circuit unit of claim 19, wherein an operation of obtaining the first time threshold value corresponding to the first operation according to the type of the first operation comprises:
    determining the first time threshold value as a first time value in response to the type of the first operation being a first type of operation which comprises the read operation; and
    determining the first time threshold value as a second time value in response to the type of the first operation being a second type of operation which comprises the write operation,
    wherein the first time value is different from the second time value.

21. The memory control circuit unit of claim 17, wherein the memory management circuit is further configured to:
    adjust the first time threshold value according to an actual completion time of the first operation.

22. The memory control circuit unit of claim 17, wherein an operation of obtaining, according to the first operation being the write operation or the read operation, the first time threshold value corresponding to the first operation comprises:
    receiving a time evaluation information corresponding to the first memory module from the rewritable non-volatile memory module; and
    determining the first time threshold value according to the time evaluation information.

23. The memory control circuit unit of claim 17, wherein the memory management circuit is further configured to:
    send a second operation command sequence to the rewritable non-volatile memory module to instruct a second memory module in the plurality of memory modules to perform a second operation;
    obtain a second time threshold value corresponding to the second operation, wherein the second time threshold value is different from the first time threshold value;
    update a second counting value corresponding to the second memory module; and
    send a second query command sequence to the rewritable non-volatile memory module to query a status of the second memory module, in response to that the second counting value reaches the second time threshold value.

24. The memory control circuit unit of claim 17, wherein the memory management circuit is further configured to:
    send a third operation command sequence to the rewritable non-volatile memory module to instruct the first memory module to perform a third operation;

obtain a third time threshold value corresponding to the third operation, wherein the third time threshold value is different from the first time threshold value;
update a third counting value corresponding to the first memory module; and
send a third query command sequence to the rewritable non-volatile memory module to query the status of the first memory module, in response to that the third counting value reaches the third time threshold value.

* * * * *